US012168344B2

(12) United States Patent
Tanizaki et al.

(10) Patent No.: US 12,168,344 B2
(45) Date of Patent: Dec. 17, 2024

(54) PRINTING DEVICE HAVING ENGAGEMENT PORTION ENGAGEABLE WITH EXTERNAL COMPONENT FOR STABLE ATTACHMENT THEREOF TO THE PRINTING DEVICE

(71) Applicant: BROTHER KOGYO KABUSHIKI KAISHA, Nagoya (JP)

(72) Inventors: Masashi Tanizaki, Kuwana (JP); Koshiro Shimoda, Tokoname (JP); Yuya Nakamura, Toyoake (JP); Tetsuro Muramatsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 239 days.

(21) Appl. No.: 18/049,020

(22) Filed: Oct. 24, 2022

(65) Prior Publication Data

US 2023/0125916 A1 Apr. 27, 2023

(30) Foreign Application Priority Data

Oct. 25, 2021 (JP) ................................ 2021-173975

(51) Int. Cl.
*B41J 11/00* (2006.01)
*B41J 29/02* (2006.01)

(52) U.S. Cl.
CPC .......... *B41J 11/0045* (2013.01); *B41J 29/02* (2013.01)

(58) Field of Classification Search
CPC ........ B41J 11/0045; B41J 29/02; B41J 29/13; B41J 29/00; B41J 29/023; B41J 29/026
See application file for complete search history.

(56) References Cited

U.S. PATENT DOCUMENTS

2017/0080723 A1* 3/2017 Nohara ...................... B41J 3/36
2017/0213061 A1* 7/2017 Takahashi ........... H04N 1/0083
2023/0029883 A1* 2/2023 Shimoda ............. B41J 11/0024

FOREIGN PATENT DOCUMENTS

JP 2012-223923 A 11/2012

* cited by examiner

*Primary Examiner* — Kristal Feggins
(74) *Attorney, Agent, or Firm* — KENEALY VAIDYA LLP

(57) ABSTRACT

There is provided a printing device to which an external component is attachable. The printing device includes: a housing; a print head provided inside the housing; a guide portion configured to guide a printing medium to the print head in a conveying direction; and a first engagement portion engageable with a first attaching portion of the external component. The housing includes a first frame, a second frame opposite the first frame in a widthwise direction crossing the conveying direction, and a connecting portion extending in the widthwise direction to connect the first frame to the second frame. The print head is supported by at least one of the first frame and the second frame. The guide portion is fixed to the connecting portion. The first engagement portion is formed in one of the guide portion and the connecting portion.

13 Claims, 9 Drawing Sheets

PRINTING DEVICE HAVING ENGAGEMENT PORTION ENGAGEABLE WITH EXTERNAL COMPONENT FOR STABLE ATTACHMENT THEREOF TO THE PRINTING DEVICE

REFERENCE TO RELATED APPLICATIONS

This application claims priority from Japanese Patent Application No. 2021-173975 filed on Oct. 25, 2021. The entire content of the priority application is incorporated herein by reference.

BACKGROUND ART

There has been conventionally known a compact printing device capable of performing printing on a print sheet. A prior art discloses a printing device having a generally rectangular parallelepiped shape, the rectangular parallelepiped shape being elongated in a widthwise direction of a print sheet to be inserted into the device and having a smaller dimension with respect to a conveying direction of the print sheet than that with respect to the widthwise direction. The printing device is designed in view of portability of the same. An external component such as a roll holder can be attached to the printing device so that the printing device can perform printing on continuous sheets such as a rolled sheet.

The roll holder attachable to the above-described printing device includes a support portion configured to support the rolled sheet with respect to its widthwise direction, and a grip portion configured to be assembled to the printing device. The grip portion has a generally U-shape in a side view, and is configured to nip an outer cover of the printing device vertically to realize attachment of the roll holder to the printing device.

DESCRIPTION

However, in the above-described printing device, a printing portion is disposed inside a housing, and the outer cover is assembled to the housing to cover the same. Since the roll holder is attached to the outer cover in such a manner that the roll holder holds the outer cover, the positioning of the roll holder relative to the housing (to which the printing portion is fixed) is performed indirectly via the outer cover. As such, in a case where the outer cover is assembled to the housing with play, accurate conveyance of the sheet relative to the printing portion is hard to be obtained in the printing device.

In view of the foregoing, it is an object of the present disclosure to provide a printing device capable of realizing enhanced accuracy in positioning of an external component relative to a printing portion of the device.

In order to attain the above and other object, the present disclosure provides a printing device to which an external component is attachable. The printing device includes a housing, a print head, a guide portion, and a first engagement portion. The print head is provided in the housing and is configured to form an image on a printing medium. The guide portion is configured to guide the printing medium to the print head in a conveying direction. The first engagement portion is engageable with a first attaching portion of the external component for attachment of the external component to the printing device. The housing includes a first frame, a second frame, and a connecting portion. The second frame is positioned opposite the first frame in a widthwise direction crossing the conveying direction. The print head is supported by at least one of the first frame and the second frame. The connecting portion extends in the widthwise direction to connect the first frame to the second frame. The guide portion is fixed to the connecting portion. The first engagement portion is formed in one of the guide portion and the connecting portion.

In the above printing device, the print head is supported by the housing and is fixed in position relative to the housing. For attaching the external component to the printing device, the first attaching portion of the external component is engaged with the first engagement portion formed in either the connecting portion of the housing or the guide portion directly fixed to the connecting portion. That is, the external component is fixed in position relative to the print head through the connecting portion of the housing or through the guide portion directly fixed to the connecting portion. Since the housing functions to secure rigidity of the printing device, the external component can be fixed in position relative to the print head with accuracy upon attachment of the external component to the printing device. This configuration is advantageous in realizing accurate positioning of the external component relative to the print head, compared to a case where the external component is attached to a member that is attached to the housing with some play.

FIG. 4 is a cross-sectional view of the printing device 1 taken along a line IV-IV in

FIG. 1.

Figure 5:
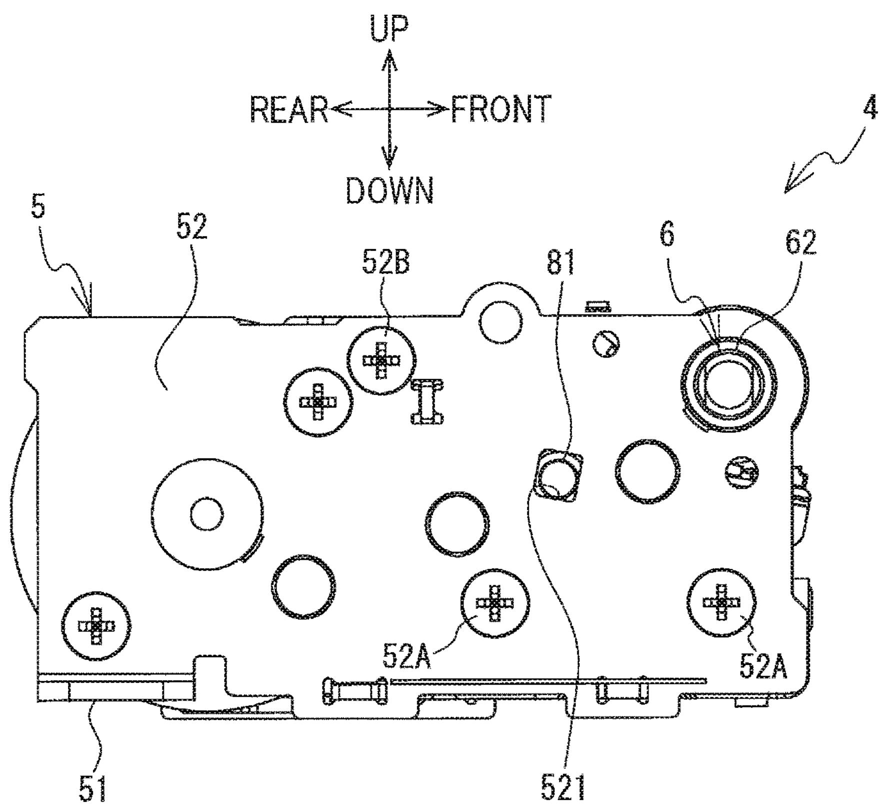

FIG. 5 is a left side view of a head unit 4 of the printing device 1.

Figure 6:
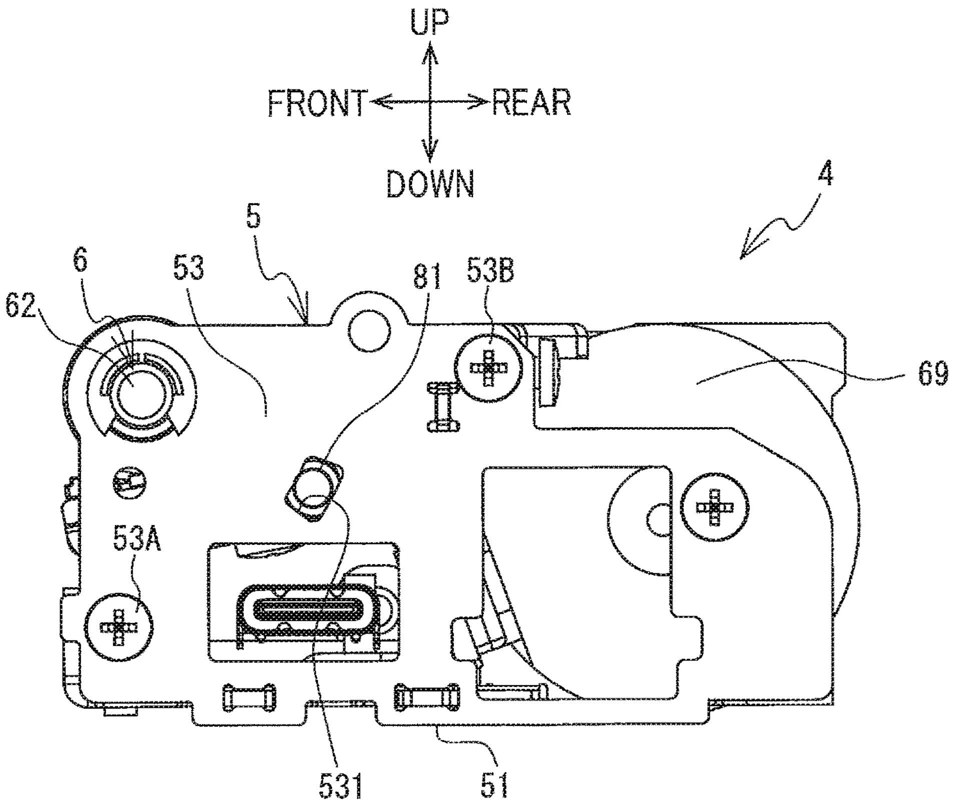

FIG. 6 is a right side view of the head unit 4.

Figure 7:
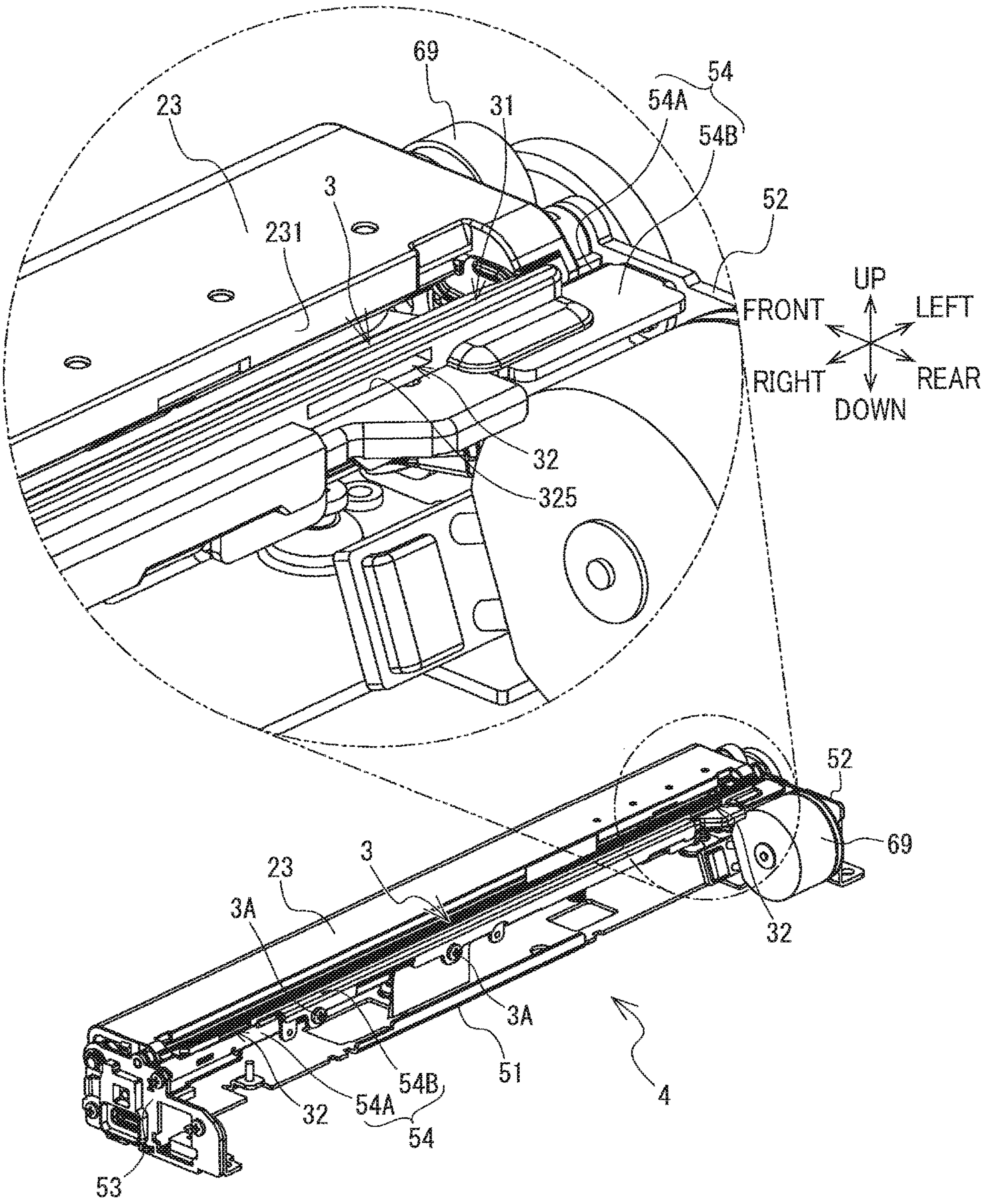

FIG. 7 is a rear perspective view of the head unit 4.

Figure 8:
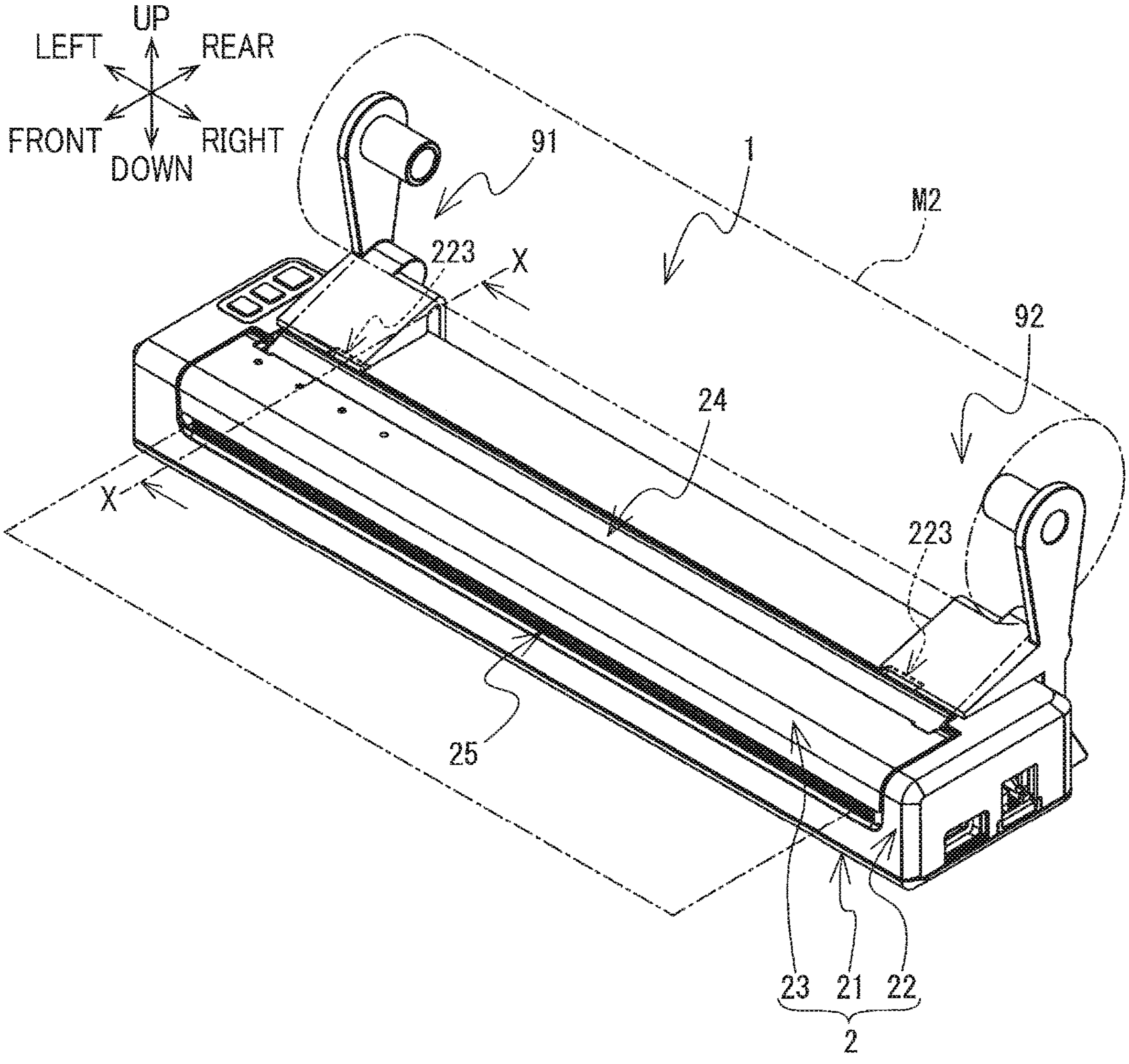

FIG. 8 is a front perspective view of the printing device 1 to which roll holders 91, 92 are attached.

Figure 9:
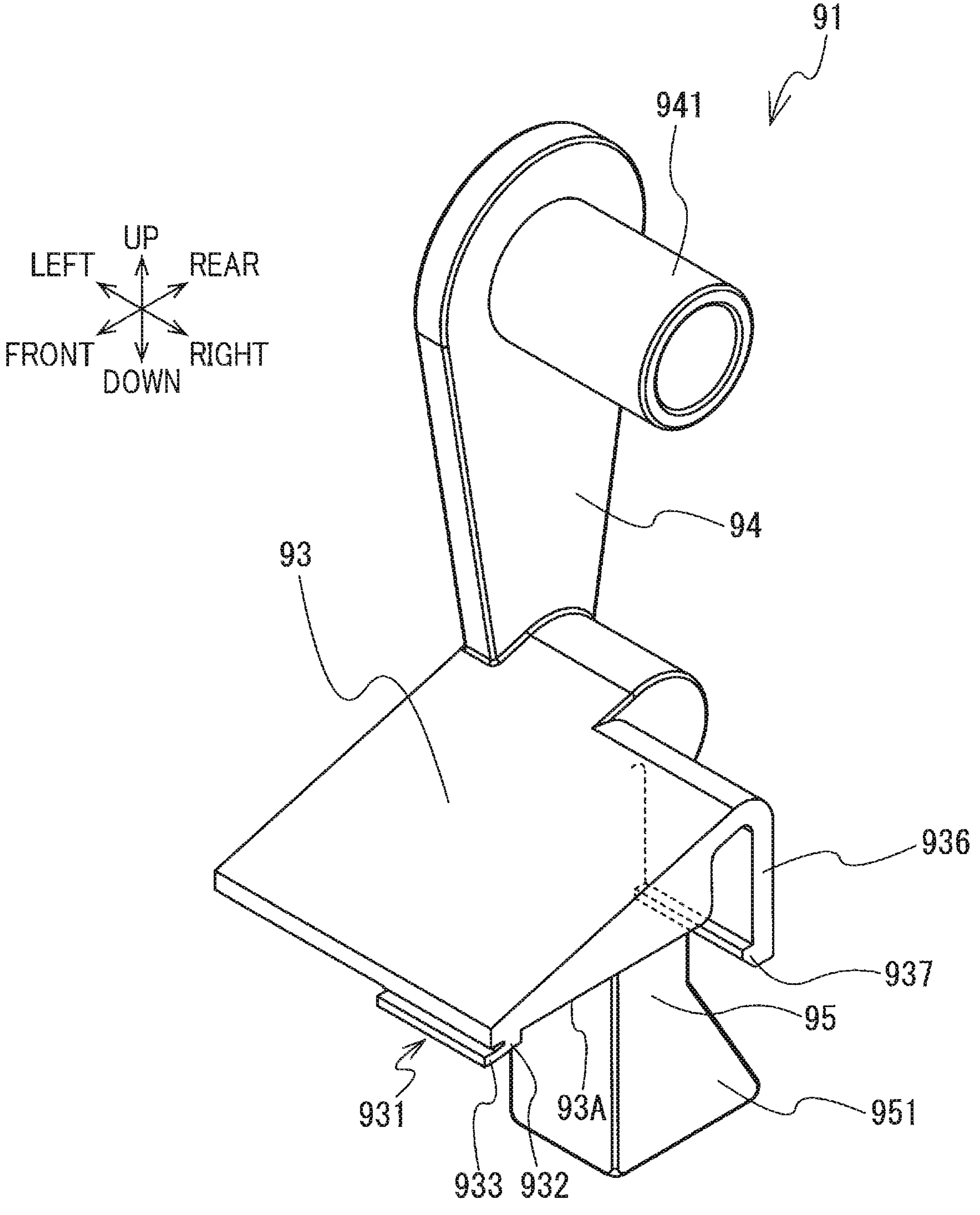

FIG. 9 is a perspective view of the roll holder 91.

Figure 10:
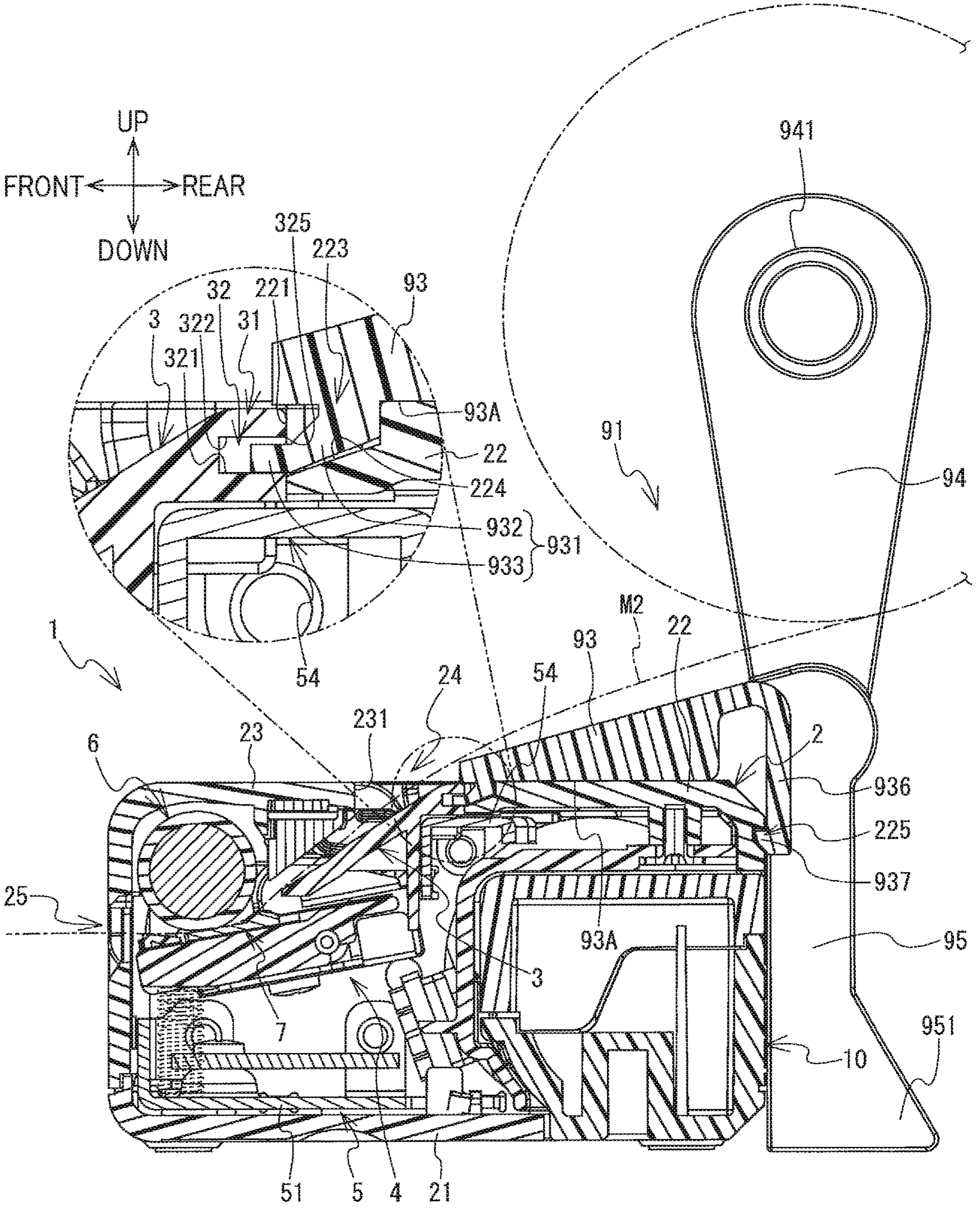

FIG. 10 is a cross-sectional view of the printing device 1 of FIG. 8 taken along a line X-X in FIG. 8.

A printing device 1 according to one embodiment of the present disclosure will be described with reference to FIGS. 1 to 10.

Hereinafter, the lower-left, upper-right, upper-left, lower-right, top and bottom in FIG. 1 will be referred to as the front, rear, left, right, top and bottom of the printing device 1.

Figure 1:
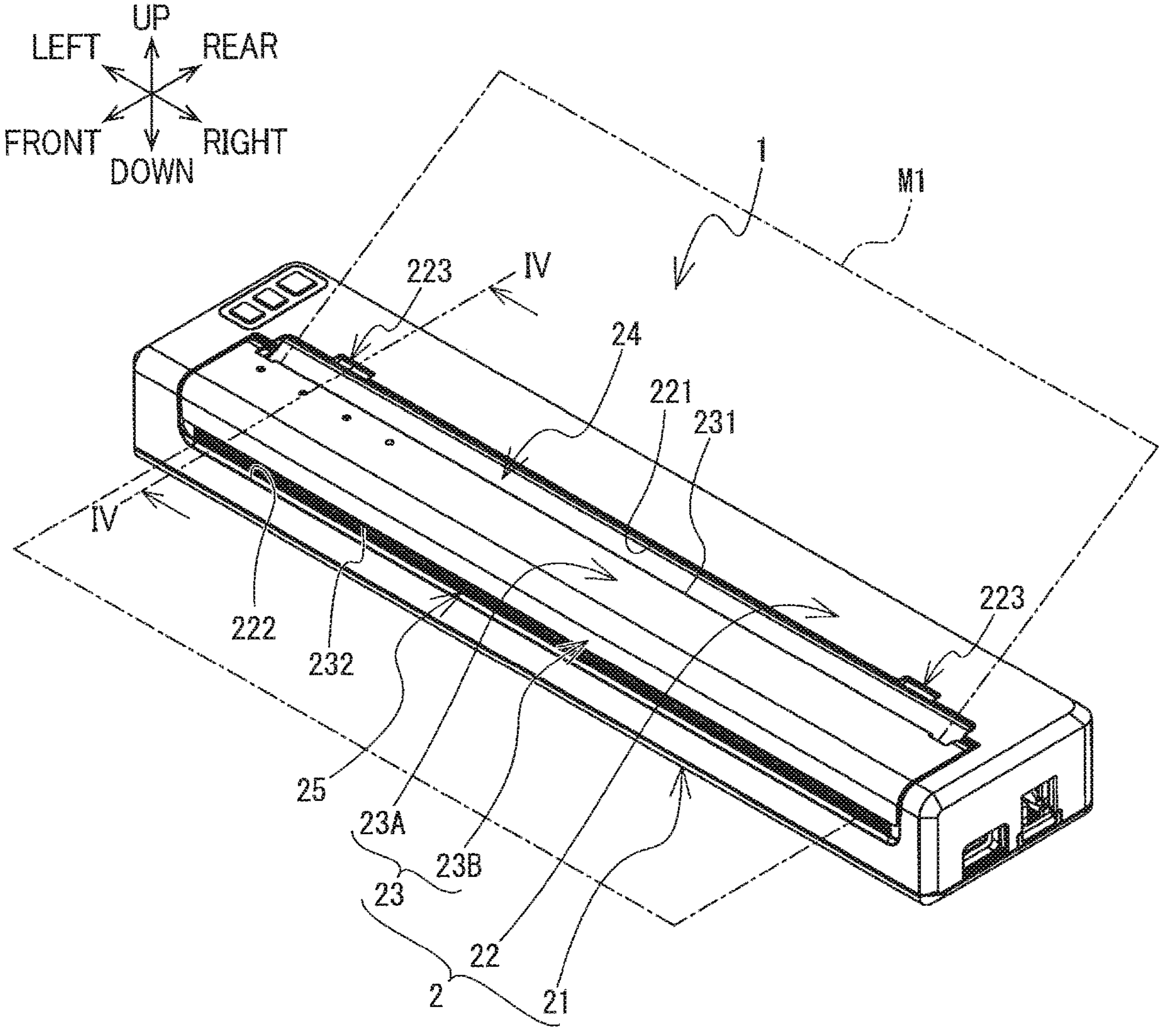
FIG. 1 is a front perspective view of a printing device 1.

The printing device 1 illustrated in FIG. 1 is configured to form an image on a medium M1 based on print data. The medium M1 is not limited a specific medium, but may be a sheet-like or a tape-like medium, for example. The medium M1 illustrated in FIG. 1 is heat-sensitive type cut paper.

Figure 2:
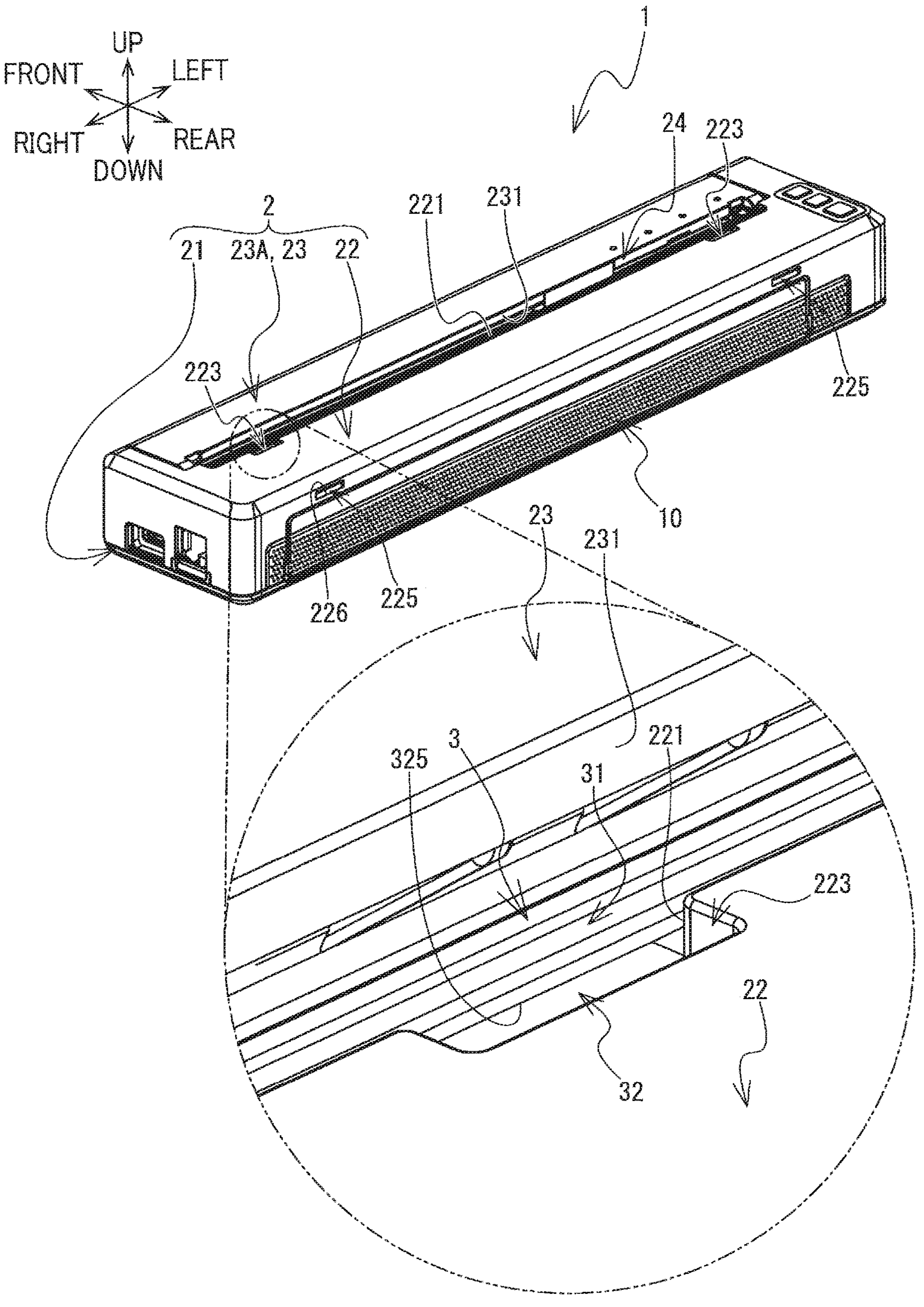
FIG. 2 is a rear perspective view of the printing device 1.
Figure 3:
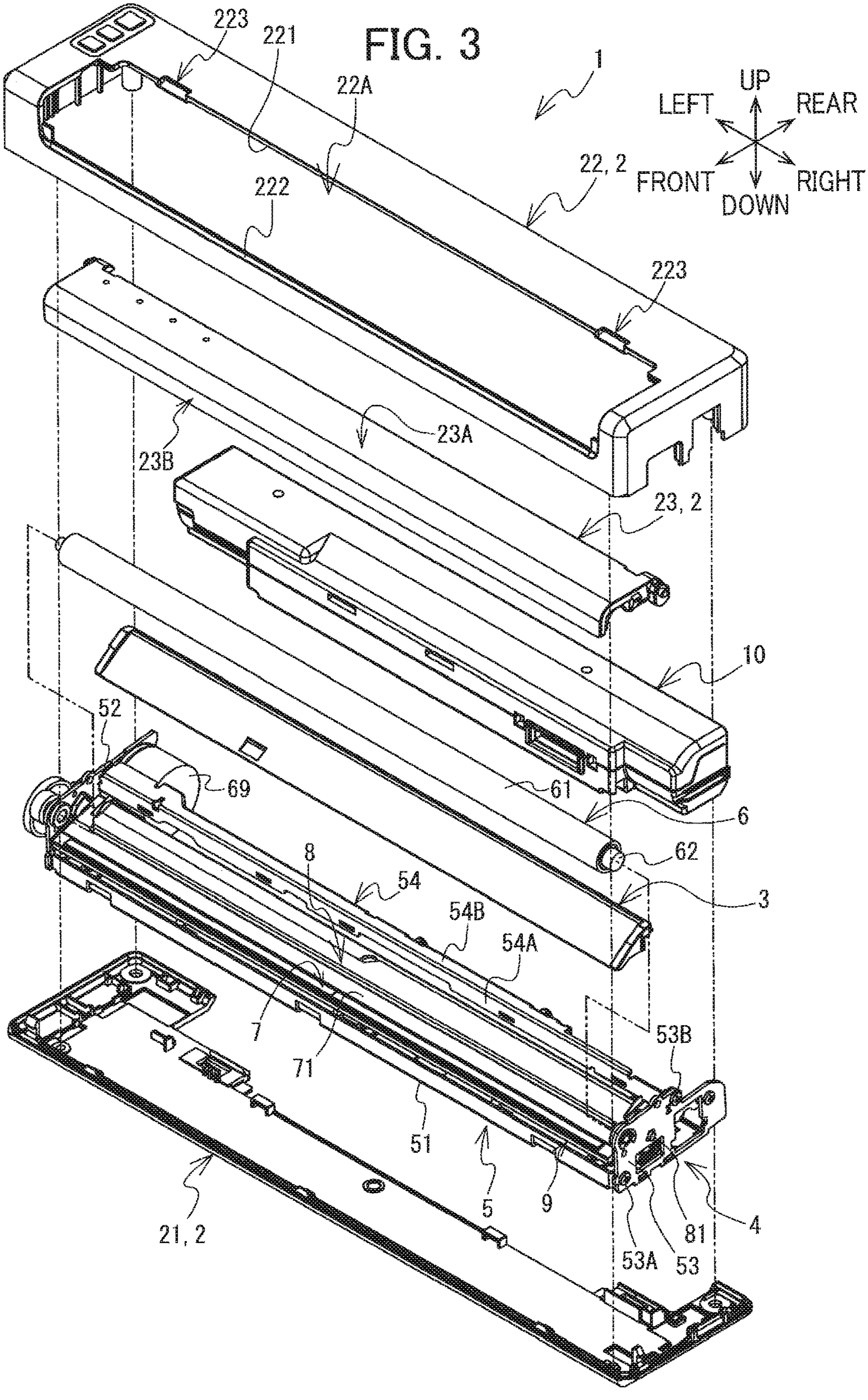
FIG. 3 is an exploded perspective view of the printing device 1.

Referring to FIGS. 1 to 3, an outer appearance of the printing device 1 will be described.

The printing device 1 includes an outer cover 2 made of resin. The outer cover 2 has a rectangular parallelepiped shape whose dimension in a left-right direction is greater than dimensions thereof in a front-rear direction and an up-down direction. A battery 10 (see FIG. 3) is attachable to a lower-rear portion of the outer cover 2. The battery 10 can supply power to the printing device 1.

The outer cover 2 includes a lower cover 21, an upper cover 22, and an open-close cover 23. The lower cover 21 has a plate-like shape and extends in the front-rear direction and in the left-right direction. The lower cover 21 constitutes a lower wall portion of the outer cover 2. The lower cover 21 has a rear edge that is notched frontward to provide an open rear end for receiving the battery 10 therethrough.

The upper cover 22 has a box-like shape that is open downward. The upper cover 22 is assembled to the lower cover 21 from above. The upper cover 22 has a rear wall whose lower edge is notched upward to provide an open rear end for receiving the battery 10 therethrough (see FIG. 2).

An opening 22A (see FIG. 3) is formed in the upper cover 22. The opening 22A is open on a front surface of the upper cover 22 as well as on an upper surface of the upper cover 22. Specifically, the opening 22A provides: an open portion in a front wall of the upper cover 22, the open portion spanning from a vertical center portion to an upper end portion of the front wall; and an open portion in an upper wall of the upper cover 22, the open portion spanning from a front-rear center portion to a front end portion of the upper wall. The opening 22A extends in the left-right direction from a position near a left end of the upper cover 22 to a position near a right end of the upper cover 22. Hereinafter, in the upper cover 22, an edge defining a rear end of the opening 22A will be defined as "opening edge 221", and an edge defining a lower end of the opening 22A will be referred to as "opening edge 222".

Two second engagement portions 223 are formed at the opening edge 221. One of the second engagement portions 223 is at a position near a left end of the opening 22A and, a remaining one of the second engagement portions 223 is at a position near a right end of the opening 22A. Each second engagement portion 223 is a grooved portion that is recessed downward from the upper surface of the upper cover 22 and that is open frontward toward the second opening edge 221 (see FIG. 3). Each second engagement portion 223 has a sloped bottom surface 224 whose front end (the end near the opening edge 221) is positioned lower than a rear end thereof in the front-rear direction (see FIG. 4). That is, each second engagement portion 223 becomes deeper toward the opening edge 221 (toward the front) such that the front end of the sloped bottom surface 224 is connected to the opening edge 221. The second engagement portions 223 are respectively connected to first engagement portions 32 of a guide member 3 (described later). As will be described later, first attaching portions 931 of roll holders 91, 92 (described later) are respectively engageable with the second engagement portions 223.

The upper cover 22 further has two third engagement portions 225. The third engagement portions 225 are provided at the rear wall of the upper cover 22 at positions above the open rear end of the rear wall of the upper cover 22 through which the battery 10 is attached. Further, with respect to the left-right direction, the two third engagement portions 225 are positioned respectively near left and right ends of the open rear end in the rear wall of the upper cover 22. The positions of the two third engagement portions 225 respectively correspond to the positions of the two second engagement portions 223 in the left-right direction. Each third engagement portion 225 is in a form of a recess having a rectangular shaped opening that is elongated in the left-right direction. As will be described later, second attaching portions 936 of the roll holders 91, 92 (described later) are respectively engageable with the third engagement portions 225.

The open-close cover 23 is plate shaped and has a first part 23A and a second part 23B. The first part 23A extends in the front-rear direction and in the left-right direction. The second part 23B extends downward from a front end of the first part 23A and also extends in the left-right direction. The open-close cover 23 is fitted in the opening 22A of the upper cover 22. The open-close cover 23 is pivotable about a rear end 231 of the first part 23A as a fulcrum, such that the open-close cover 23 can open and close the opening 22A.

Hereinafter, the description will be made based on a state illustrated in FIG. 1 where the open-close cover 23 closes the opening 22A. In the closed state of the open-close cover 23, the rear end 231 of the first part 23A faces the opening edge 221 of the opening 22A in the upper cover 22 with a space therebetween in the front-rear direction. Further, a lower end 232 of the second part 23B faces the opening edge 222 of the opening 22A in the upper cover 22 with a space therebetween in the up-down direction.

The outer cover 2 has an insertion opening 24. The insertion opening 24 is formed in the upper wall of the outer cover 2. Specifically, the insertion opening 24 is a slot opening defined by the opening edge 221 of the opening 22A of the upper cover 22 and the rear end 231 of the open-close cover 23. The medium M1 can be inserted into an interior of the outer cover 2 through the insertion opening 24.

The outer cover 2 has a discharge opening 25. The discharge opening 25 is formed in the front wall of the outer cover 2. The discharge opening 25 is a slot opening defined by the opening edge 222 of the opening 22A of the upper cover 22 and the lower end 232 of the open-close cover 23. After image formation is performed on the medium M1 inside the outer cover 2, the medium M1 is configured to be discharged to an outside of the outer cover 2 through the discharge opening 25.

Referring to FIGS. 3 to 7, an internal structure of the printing device 1 will be described.

The printing device 1 includes a head unit 4. The head unit 4 is accommodated in the outer cover 2. The head unit 4 includes a housing 5, a platen roller 6, a thermal head 7, and a heat sink 8.

The housing 5 is made of metal and includes a bottom plate 51, a left side plate 52, a right side plate 53, and a connecting plate 54. The bottom plate 51 is a metal plate having a rectangular shape in a plan view. The bottom plate 51 has a dimension in the left-right direction greater than a dimension thereof in the front-rear direction. The lower cover 21 is assembled to a bottom surface of the bottom plate 51.

The left side plate 52 is a metal plate having a rectangular shape elongated in the front-rear direction in a left side view (see FIG. 5). The bottom plate 51 has a left end that is fixed to a bottom portion of the left side plate 52 by a screw 52A. The right side plate 53 is a metal plate having a rectangular shape elongated in the front-rear direction in a right side view (see FIG. 6). The bottom plate 51 has a right end that is fixed to a bottom portion of the right side plate 53 by a screw 53A. The left side plate 52 and the right side plate 53 face each other in the left-right direction.

Figure 4:
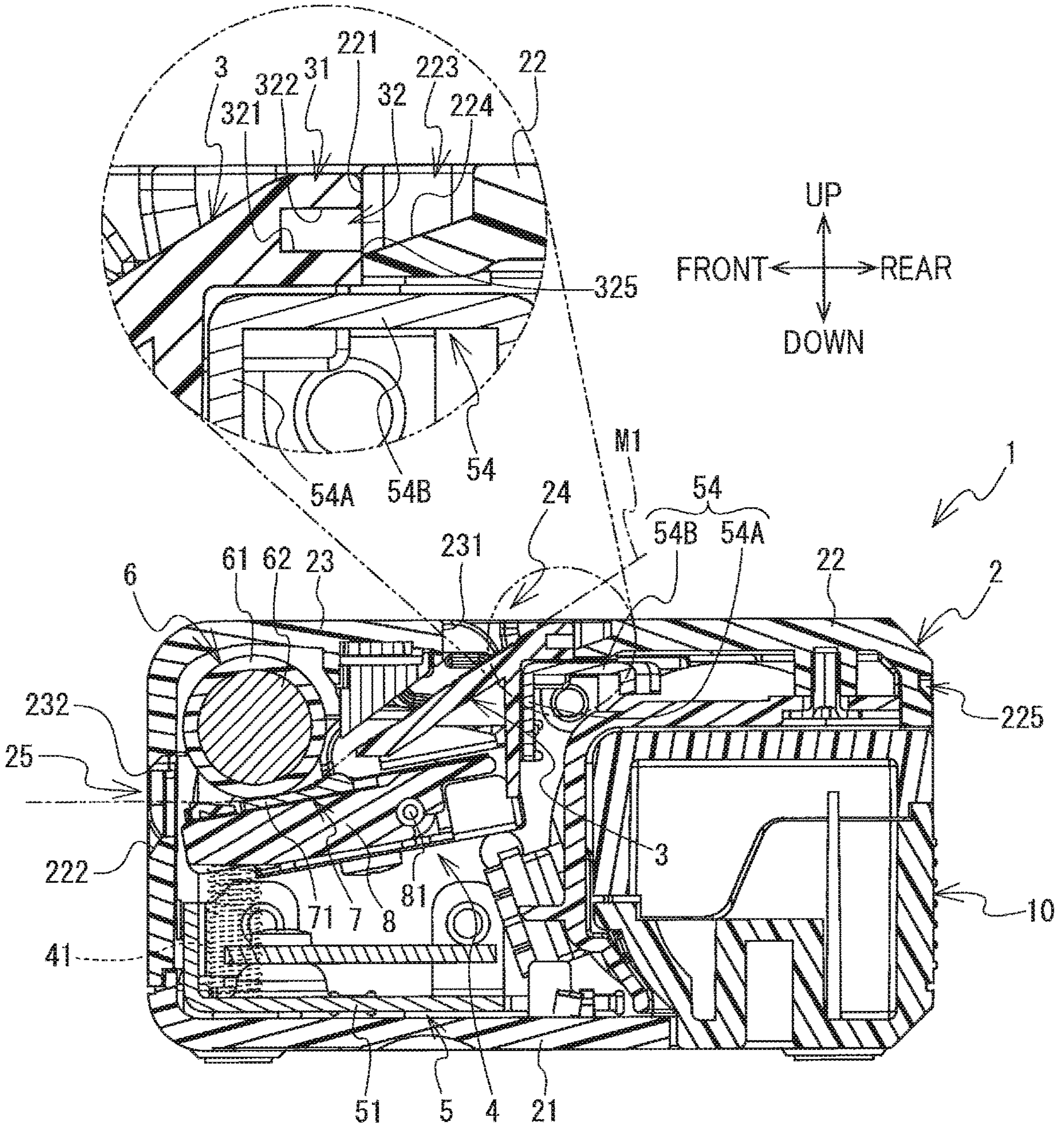

The connecting plate 54 is a metal plate extending in the left-right direction to connect the left side plate 52 to the right side plate 53. The connecting plate 54 has a substantially L-shaped cross-section in a side view, as illustrated in FIG. 4. The connecting plate 54 has a first portion 54A and a second portion 54B. The first portion 54A extends in the up-down direction and in the left-right direction. The second portion 54B extends rearward from an upper end of the first portion 54A and also extends in the left-right direction. The connecting plate 54 has a left end fixed to an upper end portion of the left side plate 52 by a screw 52B (see FIG. 5). The connecting plate 54 has a right end fixed to an upper end portion of the right side plate 53 by a screw 53B (see FIG. 6).

The platen roller 6 is provided in an upper-front corner region in the interior of the outer cover 2 (see FIG. 4). The platen roller 6 extends in the left-right direction. The platen roller 6 includes a hollow cylindrical portion 61 and a shaft 62. The cylindrical portion 61 is an elastic body made of rubber, for example. The shaft 62 penetrates through an inside of the cylindrical portion 61 and is provided over the cylindrical portion 61 to be fixed thereto. The shaft 62 has a left end supported by an upper-front corner portion of the left side plate 52. The shaft 62 has a right end supported by an upper-front corner portion of the right side plate 53. The platen roller 6 is rotatable about an axis of the shaft 62. The platen roller 6 is connected to a motor 69 through gears (not illustrated) and the like. The motor 69 is fixed on a lower-rear portion on a right surface of the left side plate 52. The platen roller 6 is rotatable by a driving force of the motor 69 to convey the medium M1 in a conveying direction. The conveying direction is a direction in which the medium M1 is configured to be conveyed by the platen roller 6, and is orthogonal to the left-right direction. In the present embodiment, the conveying direction is coincident with the front-rear direction with respect to the housing 5. Specifically, the rear side of the housing 5 is defined as an upstream side in the conveying direction, and the front side of the housing 5 is defined as a downstream side in the conveying direction.

The thermal head 7 is provided below the platen roller 6. The thermal head 7 is a line head, and includes a board 71 and a plurality of heating elements (not illustrated) provided on an upper surface of the board 71. The board 71 extends in the left-right direction and in the conveying direction. The heating elements are positioned on the upper surface of the board 71 in such a region where the heating elements and the platen roller 6 can nip the medium M1 therebetween.

The heat sink 8 is provided below the thermal head 7. The thermal head 7 is fixed to the heat sink 8. The heat sink 8 has a plate shape. The heat sink 8 is in contact with a bottom surface of the board 71 to discharge heat generated by the plurality of heating elements. The heat sink 8 extends in the left-right direction and in the conveying direction. The heat sink 8 has a rear end portion to which a shaft 81 is fixed. The shaft 81 is positioned rearward and downward of the platen roller 6, as illustrated in FIG. 4. The shaft 81 extends in the left-right direction.

As illustrated in FIG. 5, the left side plate 52 is formed with a supporting hole 521 at a position diagonally rearward and downward of the shaft 62 of the platen roller 6. The supporting hole 521 has a rectangular shape in a left side view. A left end of the shaft 81 is positioned inside the supporting hole 521. The left end of the shaft 81 is thus rotatably supported by the left side plate 52. The heat sink 8 is pivotally movable about an axis of the shaft 81.

As illustrated in FIG. 6, the right side plate 62 is formed with a holding hole 531 at a position diagonally rearward and downward of the shaft 62 of the platen roller 6. The holding hole 531 has an arcuate shape centered on the axis of the shaft 62 of the platen roller 6 in a right side view. The holding hole 531 has an upper edge positioned at the same height as an upper edge of the supporting hole 521 in the up-down direction. The holding hole 531 has a bottom edge positioned lower than a bottom edge of the supporting hole 521 in the up-down direction. A right end of the shaft 81 is positioned inside the holding hole 531. Because the bottom edge of the holding hole 531 is positioned lower than the bottom edge of the supporting hole 521 in the up-down direction, a gap is formed between the right end of the shaft 81 and the bottom edge of the holding hole 531 in the up-down direction. Accordingly, the right end of the shaft 81 is a free end, not a fixed end.

As illustrated in FIG. 4, a coil spring 41 is provided inside the housing 5. The coil spring 41 extends in the up-down direction and is positioned between a bottom surface of the heat sink 8 and an upper surface of the bottom plate 51. The coil spring 41 urges the heat sink 8 such that the heat sink 8 can pivot about the axis of the shaft 81 clockwise in a right side view.

As illustrated in FIGS. 3, 4, and 7, the printing device 1 further includes the guide member 3 made of resin. The guide member 3 is provided upstream of the thermal head 7 in the conveying direction. The guide member 3 is fixed to the first portion 54A of the connecting plate 54. Inside the outer cover 2, the guide member 3 is positioned immediately below the insertion opening 24. The guide member 3 is plate shaped. The guide member 3 extends in the left-right direction and also extends diagonally frontward and downward from an upper edge of the insertion opening 24 (through the insertion opening 24). The guide member 3 is configured to guide the medium M1 inserted through the insertion opening 24 toward a position between the thermal head 7 and the platen roller 6 to define a path along which the medium M1 is configured to be conveyed.

The guide member 3 has a rear end portion 31 positioned above the second portion 54B of the connecting plate 54. The rear end portion 31 has a thickness in the up-down direction substantially the same as a thickness of the upper wall of the upper cover 22 in the up-down direction. The rear end portion 31 has a rear surface facing the opening edge 221 of the opening 22A of the upper cover 22.

Two first engagement portions 32 are formed at the rear end portion 31. One of the two first engagement portions 32 is positioned near a left end of the guide member 3 in the left-right direction, while a remaining one of the two first engagement portions 32 is positioned near a right end of the guide member 3 in the left-right direction. The two first engagement portions 32 are positioned respectively at the same positions as the two second engagement portions 223 in the left-right direction.

Each first engagement portion 32 is a recess that is recessed frontward from the rear surface of the rear end portion 31 to provide an opening 325 thereon (see FIGS. 2 and 7). That is, each first engagement portion 32 provides the opening 325 that is open rearward on the rear surface of the rear end portion 31. Each opening 325 has a rectangular shape elongated in the left-right direction. Each opening 325 has a size in the left-right direction substantially the same as a size in the left-right direction of each second engagement portion 223. As described above, the first engagement portions 32 are connected to the corresponding second engagement portions 223 of the upper cover 22. In a state where the first engagement portions 32 are connected to the corresponding second engagement portions 223, the sloped bottom surface 224 of each second engagement portion 223 slopes toward a side surface 321 of the corresponding first engagement portion 32, the side surface 321 constituting a lower side surface of the recess (see FIG. 4). As will be described later, the first attaching portions 931 of the respective roll holders 91, 92 are engageable with the corresponding pairs of the first engagement portions 32 and the second engagement portions 223.

Referring to FIG. 4, a printing operation performed by the printing device 1 will be described next.

A user inserts the medium M1 into the interior of the outer cover 2 through the insertion opening 24 along the guide member 3. Upon insertion of the medium M1, a downstream end (leading end) of the medium M1 is positioned between the platen roller 6 and the thermal head 7. Upon driving of the motor 69, the platen roller 6 is rotated in a clockwise direction in a right side view to convey the medium M1 in the conveying direction toward the downstream, i.e., toward the discharge opening 25. While the medium M1 is conveyed, the heating elements are selectively heated, under control of a control board (not illustrated) of the printing device 1, to perform printing on the medium M1. The medium M1 is then discharged through the discharge opening 25. In this way, the user can obtain the medium M1 on which an image has been formed.

Referring to FIGS. 8 to 10, a pair of roll holders 91, 92 attachable to the printing device 1 will be described next.

Various types of external components can be attached to the printing device 1 through the first engagement portions 32, the second engagement portions 223, and the third engagement portions 225. In the present embodiment, the pair of roll holders 91, 92 is detachably attached to the printing device 1 as one example of such external components. In a state where the roll holders 91, 92 are attached to the printing device 1, the roll holders 91, 92 can retain, as a medium M2, a sheet roll which is a roll of a heat-sensitive type sheet.

The roll holder 91 is attached to a left end portion of the printing device 1 to hold a left end of the sheet roll. The roll holder 92 is attached to a right end portion of the printing device 1 to hold a right end of the sheet roll. The roll holders 91, 92 are symmetric to each other in shape with respect to the left-right direction. Hence, only the roll holder 91 will be described in detail hereinafter, and a description for the roll holder 92 will be omitted.

The roll holder 91 includes a body portion 93, a supporting portion 94, and a leg portion 95. The body portion 93 is a plate-shaped portion having a generally rectangular shape in a plan view. The body portion 93 has a substantially triangular shape in a side view and has a thickness which becomes greater toward the rear. The body portion 93 has a size in the front-rear direction substantially the same as a size in the front-rear direction of a portion of the upper cover 22, the portion being positioned rearward of the opening 22A, as described in FIG. 8. The body portion 93 has a size in the left-right direction substantially the same as a size in the left-right direction of a portion of the upper cover 22, the portion spanning between the right edge of the left second engagement portion 223 and the left end of the opening 22A. The body portion 93 has a bottom surface 93A which is a rectangular-shaped flat surface. The bottom surface 93A comes into contact with the upper surface of the upper cover 22 upon attachment of the roll holder 91 to the printing device 1.

The body portion 93 includes the first attaching portion 931 and the second attaching portion 936. The first attaching portion 931 is provided at a right-front corner portion of the bottom surface 93A of the body portion 93 to protrude downward therefrom. The first attaching portion 931 has a length in the left-right direction slightly smaller than a length in the left-right direction of the left first engagement portion 32 and a length in the left-right direction of the left second engagement portion 223.

The first attaching portion 931 includes a first protruding portion 932 and a second protruding portion 933. The first protruding portion 932 protrudes downward from the bottom surface 93A at a position slightly rearward of the front end of the bottom surface 93A, and bends diagonally frontward to have a lower end connected to the second protruding portion 933. The second protruding portion 933 extends frontward in parallel to the bottom surface 93A from the lower end of the first protruding portion 932, and protrudes further frontward relative to a front end of the body portion 93. The second protruding portion 933 faces the bottom surface 93A with a gap therebetween in the up-down direction. The gap has a thickness (gap distance) slightly greater than a thickness between the upper surface of the rear end portion 31 of the guide member 3 and a side surface 322 of the corresponding (left) first engagement portion 32, the side surface 322 opposing the side surface 321 and constituting an upper side surface of the recess (see FIG. 4). In a state where the roll holder 91 is attached to the printing device 1, the first protruding portion 932 is engaged with the left second engagement portion 223 and the second protruding portion 933 is engaged with the left first engagement portion 32. The direction in which the first protruding portion 932 extends from the bottom surface 93A of the body portion 93 is generally coincident with a sloping direction of the sloped bottom surface 224 of the corresponding second engagement portion 223.

The second attaching portion 936 has a plate-like shape and has a length in the left-right direction greater than a length in the left-right direction of the first attaching portion 931. The second attaching portion 936 extends rearward from a rear end of the body portion 93, and then bends downward. With this shape of the second attaching portion 936, a bottom end portion of the second attaching portion 936 is resiliently deformable with respect to the front-rear direction. The bottom end portion of the second attaching portion 936 is positioned below the body portion 93 (see FIG. 10). In the state where the roll holder 91 is attached to the printing device 1, the bottom end portion of the second attaching portion 936 is positioned rearward of the corresponding third engagement portion 225. The bottom end portion of the second attaching portion 936 has a third protruding portion 937 protruding frontward. The third protruding portion 937 has a length in the left-right direction slightly smaller than a length in the left-right direction of the corresponding third engagement portion 225. In the state where the roll holder 91 is attached to the printing device 1, the third protruding portion 937 is engaged with the corresponding (left) third engagement portion 225.

The supporting portion 94 protrudes upward from a left-rear corner portion of the body portion 93. The supporting portion 94 has a plate shape extending in the front-rear direction and in the up-down direction, and is elongated in the up-down direction. The supporting portion 94 has an upper end portion provided with a shaft portion 941 protruding rightward therefrom. The shaft portion 941 is configured to be inserted into a hollow space of the sheet roll to rotatably support the sheet roll.

The leg portion 95 is has a rectangular columnar shape extending downward from the rear end of the body portion 93. The leg portion 95 has a bottom end portion positioned lower than the second attaching portion 936. In the state where the roll holder 91 is attached to the printing device 1, the leg portion 95 is in contact with the rear surface of the printing device 1 such that a bottom end of the leg portion 95 is at the same position as a bottom surface of the printing device 1. The bottom end portion of the leg portion 95 has a foot part 951 protruding rearward. The foot part 951 is configured to restrict the roll holder 91 from falling rearward in a state where the sheet roll is supported by the supporting portion 94.

For attaching each of the above-described roll holders 91, 92 to the printing device 1, a user tilts the body portion 93 frontward and downward and inserts the second protruding portion 933 of the first attaching portion 931 into the corresponding second engagement portion 223, as described in FIG. 10. The front end of the bottom surface 93A comes in contact with the upper surface of the rear end portion 31 of the guide member 3. When the user then moves a rear portion of the body portion 93 downward, the second protruding portion 933 is guided along the sloped bottom surface 224 to be inserted into the corresponding first engagement portion 32 through the opening 325. As the user moves the rear portion of the body portion 93 further downward, the second protruding portion 933 is brought into engagement with the corresponding first engagement portion 32 and the first protruding portion 932 is brought into engagement with the corresponding second engagement portion 223. Since the first protruding portion 932 extends, while bending, from the bottom surface 93A of the body portion 93, the first protruding portion 932 lies along the slope of the sloped bottom surface 224 when engaged with the second engagement portion 223. With this structure, interference between the first protruding portion 932 and the bottom surface 224 hardly occurs for engagement therebetween.

During the attachment of each roll holder 91, 92 to the printing device 1, the third protruding portion 937 of the second attaching portion 936 comes into contact with an outer surface of the upper cover 22. As the user moves the rear portion of the body portion 93 further downward, the third protruding portion 937 moves downward along the outer surface of the upper cover 22 such that the bottom end portion of the second attaching portion 936 is resiliently deformed rearward. When the third protruding portion 937 reaches the opening 325 of the corresponding third engagement portion 225, the third protruding portion 937 is inserted into the corresponding third engagement portion 225 due to a restoration force (urging force) of the second attaching portion 936 generated by the resilient deformation thereof, thereby realizing engagement of the third protruding portion 937 with the corresponding third engagement portion 225.

In the state where the roll holders 91, 92 are attached to the printing device 1, the rear end portion 31 of the guide member 3, which is fixed directly to the housing 5, is nipped between the second protruding portion 933 of each first attaching portion 931 and the bottom surface 93A of each body portion 93 in the up-down direction. With this structure, the roll holders 91, 92 attached to the printing device 1 are fixed in position in the up-down direction relative to the housing 5. Further, the first attaching portions 931 are in engagement with the respective first engagement portions 32 whose size in the left-right direction is slightly greater than that of the first attaching portions 931. The second attaching portions 936 are in engagement with the respective third engagement portions 225 whose size in the left-right direction is slightly greater than that of the second attaching portions 936. With this structure, the roll holders 91, 92 are fixed in position in the left-right direction relative to the housing 5. Further, in a state where the first protruding portions 932 of the first attaching portions 931 are in engagement with the respective second engagement portions 223 and the third protruding portions 937 of the second attaching portions 936 are in engagement with the respective third engagement portions 225, the second attaching portions 936 and the first attaching portions 931 hold the upper cover 22 therebetween in the front-rear direction due to the resilient restoration force generated by the resilient deformation of the second attaching portions 936. With this structure, the roll holders 91, 92 are fixed in position in the front-rear direction relative to the housing 5.

As described above, the thermal head 7 is supported by the housing 5 and is fixed in position with respect to the housing 5. In the state where the roll holders 91, 92 are attached to the printing device 1, the first attaching portions 931 of the roll holders 91, 92 are engaged with the corresponding first engagement portions 32 formed in the guide member 3 which is fixed to the connecting plate 54 of the housing 5. That is, the roll holders 91, 92 are fixed in position relative to the thermal head 7 via the guide member 3 directly fixed to the connecting plate 54 of the housing 5. In the printing device 1, the housing 5 is a component for securing rigidity of the printing device 1. Hence, the printing device 1 according to the embodiment can provide accurate positioning of the roll holders 91, 92 relative to the thermal head 7. In comparison to a configuration where the roll holders 91, 92 are attached to a component which is loosely assembled to the housing 5, the printing device 1 according to the embodiment can provide enhanced accuracy in positioning of the roll holders 91, 92 relative to the thermal head 7.

The second engagement portions 223 of the outer cover 2 are in engagement with the first attaching portions 931 of the respective roll holders 91, 92 which are in engagement with the respective first engagement portions 32. The outer cover 2 is a component covering the housing 5 and constituting an outer cell of the printing device 1. In the printing device 1, the first attaching portions 931 of the roll holders 91, 92 can engage the respective first engagement portions 32 to provide positioning accuracy of the roll holders 91, 92. Further, the first attaching portions 931 of the roll holders 91, 92 can also engage the respective second engagement portions 223. That is, the roll holders 91, 92 can be held by the housing 5 (by the first engagement portions 32) and the outer cover 2 (by the second engagement portions 223). With this structure, the roll holders 91, 92 attached to the printing device 1 can be stabilized, and enhanced accuracy can be obtained in positioning of the roll holders 91, 92 relative to the thermal head 7.

Since the second attaching portions 936 (third protruding portions 937) are engaged with the respective third engagement portions 225 of the outer cover 2, the roll holders 91, 92 attached to the outer cover 2 can be further stabilized. Hence, in the printing device 1 according to the embodiment, further enhanced accuracy can be obtained in positioning of the roll holders 91, 92 relative to the thermal head 7.

Upon attachment of the roll holders 91, 92 to the printing device 1, the guide member 3 is interposed between the bottom surface 93A of the roll holders 91, 92 and the first protruding portions 932 of the first attaching portions 931. In this way, the roll holders 91, 92 are thus fixed in position in the up-down direction. Further, since the second attaching portions 936 are engaged with the respective third engagement portions 225 with respect to the front-rear direction, the roll holders 91, 92 are also fixed in position in the up-down direction by the second attaching portions 936. With this structure, further enhanced accuracy can be achieved in positioning of the roll holders 91, 92 in the up-down direction relative to the thermal head 7 in the printing device 1.

The first attaching portions 931 of the roll holders 91, 92 can contact (engage) the second engagement portions 223 of the outer cover 2 at both end portions of the outer cover 2 in the left-right direction. With this structure, the second engagement portions 223 can restrict displacement of the roll holders 91, 92 in the left-right direction. Accordingly, the roll holders 91, 92 attached to the printing device 1 can be further stabilized and the positioning of the roll holders 91, 92 relative to the thermal head 7 can be provided with further enhanced accuracy.

The first attaching portions 931 of the roll holders 91, 92 can contact (engage) the second engagement portions 223 of the outer cover 2 at a rear end thereof, at the side closer to the third engagement portions 225 in the front-rear direction. Also, the second attaching portions 936 of the roll holders 91, 92 can contact (engage) the third engagement portions 225 of the outer cover 2 from the rear side, i.e., toward the second engagement portions 223 in the front-rear direction. With this structure, the second engagement portions 223 and the third engagement portions 225 can restrict displacement of the roll holders 91, 92 in the front-rear direction. Consequently, stability of the attached roll holders 91, 92 relative to the printing device 1 can be enhanced and the positioning of the roll holders 91, 92 relative to the thermal head 7 can be realized with improved accuracy.

Each of the roll holders 91, 92 can be attached to the printing device 1 at two positions with respect to the left-right direction. Accordingly, each of the roll holders 91, 92 can be held stably by the printing device 1 at two different positions. Also, since the roll holders 91, 92 are respectively held by the printing device 1, the roll holders 91, 92 can hold a sheet roll so as to support left and right ends of the sheet roll in the left-right direction. With this structure, the roll holders 91, 92 can stably hold a heavy printing medium such as a sheet roll.

For attachment of the roll holders 91, 92 to the printing device 1, the first attaching portions 931 are inserted into the respective second engagement portions 223 and guided by the sloped bottom surfaces 224 toward the respective first engagement portions 32. In this way, the attachment of the roll holders 91, 92 to the outer cover 2 can be facilitated.

The first engagement portions 32 are a recess and, therefore, forming the first engagement portions 32 can be performed without difficulty. Accordingly, accurate positioning of the roll holders 91, 92 relative to the thermal head 7 can be realized, through a simple structure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment, the thermal head 7 is supported by the left side plate 52 through the heat sink 8, whereas the thermal head 7 is supported freely (movably) by the right side plate 53. Alternatively, the thermal head 7 may be supported by the right side plate 53 and the left side plate 52 so as not to be movable relative thereto.

In the embodiment, the first engagement portions 32 are a recess formed in the rear surface of the rear end portion 31 of the guide member 3. However, the first engagement portions 32 may be formed as a through-hole.

In the above embodiment, the second engagement portions 223 are formed on the upper cover 22. Alternatively, each first engagement portion 32 and each second engagement portion 223 may be integrated and formed on the guide member 3.

In the above-described embodiment, the left side plate 52, the right side plate 53 and the connecting plate 54 are manufactured as separate members and are assembled altogether by screwing to constitute the housing 5. Alternatively, the housing 5 may be manufactured by processing a single metal plate.

While the guide member 3 is screw-fixed directly to the connecting plate 54 in the depicted embodiment, the guide member 3 may be fixed to the connecting plate 54 indirectly through other component(s).

In the embodiment, the first engagement portions 32 are formed on the guide member 3. However, the first engagement portions 32 may be formed on the connecting plate 54, rather than on the guide member 3. In this case, the first engagement portions 32 may be provided as a hole, instead of a recess. Alternatively, the guide member 3 and the connecting plate 54 may be provided as a single member by, for example, processing a metal plate. Still alternatively, the connecting plate 54 may be placed in a molding die when resin molding is performed to produce the guide member 3. In this way, the guide member 3 and the connecting plate 54 may be provided as an integrated unit. By forming the guide member 3 and the connecting plate 54 integrally as a single unit, accurate positioning of the roll holders 91, 92 relative to the thermal head 7 can be realized, regardless of whether the first engagement portions 32 are formed on the connecting plate 54 or on the guide member 3.

In the embodiment, the first attaching portions 931 of the roll holders 91, 92 are configured to contact the second engagement portions 223 of the outer cover 2 at both end portions of the outer cover 2 in the left-right direction. However, the first attaching portions 931 of the roll holders 91, 92 may not contact the second engagement portions 223, but may be positioned adjacent to the second engagement portions 223 upon attachment of the roll holders 91, 92 to the printing device 1. Even with this structure, displacement of the roll holders 91, 92 in the left-right direction can be restrained.

Still further, in the embodiment, the first attaching portions 931 of the roll holders 91, 92 are configured to contact the rear end of the second engagement portions 223 of the outer cover 2 (at the side closer to the third engagement portions 225 in the front-rear direction), as well as the third engagement portions 225 of the outer cover 2 from the rear side, i.e., toward the second engagement portions 223 in the front-rear direction. However, the first attaching portions 931 of the roll holders 91, 92 may not contact the respective engagement portions 223 and 225, but may be positioned adjacent to the second engagement portions 223 and the third engagement portions 225, respectively. Even with this structure, displacement of the roll holders 91, 92 in the front-rear direction can be restrained.

REMARKS

The printing device 1 is an example of a printing device. The roll holders 91, 92 are an example of an external component. The housing 5 is an example of a housing of the printing device. The thermal head 7 is an example of a print head. The left side plate 52 is an example of a first frame. The right side plate 53 is an example of a second frame. The connecting plate 54 is an example of a connecting portion. The guide member 3 is an example of a guide portion. The first engagement portion 32 is an example of a first engagement portion. The outer cover 2 is an example of an outer cover. The second engagement portion 223 is an example of a second engagement portion. The third engagement portion 225 is an example of a third engagement portion. The first attaching portion 931 is an example of a first attaching portion of the external component. The second attaching portion 936 is an example of a second attaching portion of the external component.

What is claimed is:

1. A printing device to which an external component is attachable, the printing device comprising:
- a housing;
- a print head provided in the housing and configured to form an image on a printing medium;
- a guide portion configured to guide the printing medium to the print head in a conveying direction; and
- a first engagement portion engageable with a first attaching portion of the external component for attachment of the external component to the printing device,
- wherein the housing comprises:
  - a first frame;
  - a second frame positioned opposite the first frame in a widthwise direction crossing the conveying direction, the print head being supported by at least one of the first frame and the second frame; and
  - a connecting portion extending in the widthwise direction to connect the first frame to the second frame,
- wherein the guide portion is fixed to the connecting portion, and
- wherein the first engagement portion is formed in one of the guide portion and the connecting portion.

2. The printing device according to claim 1, further comprising an outer cover to which the housing is assembled such that the outer cover covers the housing, the outer cover comprising a second engagement portion arranged to be aligned with the first engagement portion in the conveying direction, the first attaching portion of the external component being engageable with the second engagement portion together with the first engagement portion.

3. The printing device according to claim 2,
- wherein the outer cover further comprises a third engagement portion engageable with a second attaching portion of the external component for attachment of the external component to the printing device, the second attaching portion and the first attaching portion being arranged at different positions from each other.

4. The printing device according to claim 3,
- wherein the first attaching portion comprises:
  - a first surface configured to face the outer cover in a thickness direction crossing the conveying direction and the widthwise direction upon attachment of the external component to the printing device;
  - a first protruding portion protruding from the first surface in the thickness direction; and
  - a second protruding portion extending from the first protruding portion in parallel to the first surface,
- wherein the first engagement portion is configured to engage the second protruding portion in the conveying direction,
- wherein the third engagement portion is configured to engage the second attaching portion in the conveying direction, and
- wherein a portion of the one of the guide portion and the connecting portion is nipped between the first surface and the second protruding portion in the thickness direction upon attachment of the external component to the printing device to fix the external component in position relative to the housing in the thickness direction.

5. The printing device according to claim 4,
- wherein the second engagement portion is configured to engage the first protruding portion upon attachment of the external component to the printing device.

6. The printing device according to claim 3,
- wherein the second engagement portion is provided at each end portion of the outer cover in the widthwise direction, the second engagement portion being configured to contact or be positioned adjacent to the first attaching portion of the external component upon attachment of the external component to the printing device.

7. The printing device according to claim 3,
- wherein the second engagement portion and the third engagement portion are positioned spaced apart from each other in the conveying direction and at the same position as each other in the widthwise direction,
- wherein the second engagement portion is configured to contact or be positioned adjacent to the first attaching portion of the external component at a side closer to the third engagement portion in the conveying direction, and
- wherein the third engagement portion is configured to contact or be positioned adjacent to the second attaching portion of the external component in the conveying direction toward the second engagement portion.

8. The printing device according to claim 3,
- wherein the first engagement portion is provided at each end portion of the one of the guide portion and the connecting portion in the widthwise direction,
- wherein the second engagement portion is provided at each end portion of the outer cover in the widthwise direction, and
- wherein the third engagement portion is provided at the each end portion of the outer cover in the widthwise direction.

9. The printing device according to claim 3,
- wherein the first engagement portion is positioned opposite the third engagement portion with respect to the second engagement portion in the conveying direction, and
- wherein the second engagement portion is a recess in communication with the first engagement portion, the second engagement portion having a sloped surface serving as a bottom of the second engagement portion, the sloped surface sloping toward a bottom of the first engagement portion in the conveying direction to be connected thereto.

10. The printing device according to claim 2,
- wherein the first engagement portion is a recess whose opening is open toward the second engagement portion in the conveying direction for receiving the first attaching portion of the external component in the conveying direction.

11. The printing device according to claim 10,
- wherein the second engagement portion is a recess in communication with the first engagement portion through the opening.

12. The printing device according to claim 1,
- wherein the first engagement portion is a recess formed on the guide portion.

13. The printing device according to claim 1, wherein the connecting portion and the guide portion are formed as an integral unit.

* * * * *